United States Patent [19]
Berkowitz et al.

[11] Patent Number: 5,392,400
[45] Date of Patent: Feb. 21, 1995

[54] COLLARBORATIVE COMPUTING SYSTEM USING PSEUDO SERVER PROCESS TO ALLOW INPUT FROM DIFFERENT SERVER PROCESSES INDIVIDUALLY AND SEQUENCE NUMBER MAP FOR MAINTAINING RECEIVED DATA SEQUENCE

[75] Inventors: David B. Berkowitz, Palo Alto; Ming C. Hao, Los Altos; Hung C. Lieu, Santa Clara; Franklin D. Snow, Saratoga, all of Calif.

[73] Assignee: International Business Machines Corporation, Armonk, N.Y.

[21] Appl. No.: 909,505

[22] Filed: Jul. 2, 1992

[51] Int. Cl.⁶ .............................................. G06F 13/00
[52] U.S. Cl. ................................... 395/200; 395/650; 395/700; 395/153; 364/222.2; 364/284.4; 364/940.81; 364/DIG. 1
[58] Field of Search ............... 395/200, 650, 700, 157, 395/148, 161, 153; 364/222.2, 284.4, 940.81

[56] References Cited

U.S. PATENT DOCUMENTS

| 4,974,173 | 11/1990 | Stefik et al. | 364/521 |
| 5,008,853 | 4/1991 | Bly et al. | 364/900 |
| 5,025,314 | 6/1991 | Tang et al. | 358/93 |
| 5,124,909 | 6/1992 | Blakely et al. | 395/200 |
| 5,136,716 | 8/1992 | Harvey et al. | 395/200 |
| 5,206,934 | 4/1993 | Naef, III | 395/200 |
| 5,208,912 | 5/1993 | Nakayama et al. | 395/200 |
| 5,247,614 | 9/1993 | Eagen et al. | 395/200 |
| 5,247,615 | 9/1993 | Mori et al. | 395/200 |
| 5,261,051 | 11/1993 | Masden et al. | 395/200 |
| 5,293,619 | 3/1994 | Dean | 395/650 |

OTHER PUBLICATIONS

R. L. Verburg, "Method to Extend X Version 10.4 Network Windowing Protocol for Bit-Mapped Displays", IBM Technical Disclosure Bulletin, vol. 31, No. 3, Aug. 1988, pp. 115-116.

"X Window System, Programming and Applications with Xt OSF/Motif Edition", Prentice Hall, 1990, pp. 14-18 and 41-43.

B. Krishnamurthy et al., "An Event-Action Model of Computer-Supported Cooperative Work: Design and Implementation", Int'l. Workshop on CSCW, Germany, Apr. 1991, pp. 132-143.

S. Greenberg, "Sharing views and interactions with single-user applications", ACM Conf. on Office Information Systems, Apr. 1990, pp. 227-237.

J. C. Lauwers et al., "Collaboration Awareness in Support of Collaboration Transparency: Requirements for the Next Generation of Shared Window Systems", ACM Conf. on Office Information Systems, Apr. 1990, pp. 303-311.

Dr. J. R. Porterfield, "Mixed Blessings", HP Professional article, pp. 46–47, 50, 52.

Primary Examiner—Thomas C. Lee
Assistant Examiner—Moustafa M. Meky
Attorney, Agent, or Firm—Baker, Maxham, Jester & Meador

[57] ABSTRACT

A collaborative computing method and system are described. Output data from and input data for an application program are shared among all of the computers connected in a network using the X protocol. The output from the application program is intercepted and then replicated on each of the computers' displays. Input data for the application program can be read from any of the computers participating in the session. The identifying data associated with the output and input is modified so that each computer can operate as if it were the only computer controlling the application. The session is controlled by displaying on each computer's display a control window which allows the users to invoke a shared application and to use tools such a pointer, marker, to manage a collaboration session. Each user has equal collaborative capabilities in a session. This collaborative method provides a symmetric sharing among all users. A scratch pad window may be created on each computer's display. User data entered in a scratch pad window is normally replicated automatically on each of the other computers' displays, but a private mode is an alternative. Data entered by each computer in the scratch pad may be displayed with visual characteristics such as color which are unique to the computer on which the data was first entered.

15 Claims, 10 Drawing Sheets

COLLARBORATIVE COMPUTING SYSTEM USING PSEUDO SERVER PROCESS TO ALLOW INPUT FROM DIFFERENT SERVER PROCESSES INDIVIDUALLY AND SEQUENCE NUMBER MAP FOR MAINTAINING RECEIVED DATA SEQUENCE

TECHNICAL FIELD

The present invention relates to methods and systems in the field of collaborative computing, wherein, multiple users share computer output and generate input from separate computer workstations or personal computers.

BACKGROUND OF THE INVENTION

Over the past few years the need for a collaborative computing environment has received increasing attention. Especially in science and engineering, people are finding they can no longer work alone on their problems. At times it is appropriate to share a single running instance of an application. Many significant problems, both in leading edge science and commercial production, have run times measured in days, even on the fastest computers. It is increasingly necessary to share data and to consult with one's colleagues, often from different disciplines. Since people prefer to use the tools which are already employed in their daily work, an important part of any sharing system is to allow maximal use of currently existing tools with which the user community is familiar.

The prior art of remote conferencing techniques includes three commercially available products. BBN's conferencing feature, which is named Slate, enables users at different workstations to share and confer over a Slate multimedia document. However, Slate requires conference systems installed on all participant workstations. In contrast, the method of the invention described below requires only the initiator having the supporting software and allows generalized sharing not limited to documents. HP's SharedX software product allows sharing of X protocol based applications between two or more users in a distributed computing environment using modified X servers. SharedX mainly runs under HP/UX 300, 400, 600, and 800. The functionality of SharedX is tied to HP/UX operating system functions and is not portable. There is no support in SharedX in the areas of access control or public/private windows.

Aspects, created by Group Technologies Inc., allows participants to work on a shared document. It cannot be used to share control over application programs and only runs on Apple Macintosh computers.

The prior ad does not reveal methods which allow sharing of program output and control across processors without modification of the processor's internal operating system or use of special libraries or authorized program interfaces (API's). None of the prior art techniques is portable to all platforms. The invention described below makes collaborative computing among a plurality of processors possible without requiring existing software modification.

SUMMARY OF THE INVENTION

The present invention is a method and system for using a plurality of interconnected (networked) computers for collaborative computing. Each computer has a display and means for inputting user data, and preferably a graphical user interface. In one mode of operation output data from and input data for an application program can be shared among all of the computers. Since the application program, which can be a preexisting unmodified program, expects to produce output for and receive input from a single computer, the output from the application program is intercepted and then replicated on each of the computers' displays. Input data for the application program can be read from any of the computers participating in the session. The identifying data associated with the output and input is modified to look like it comes from a single pseudo-server, so that each computer can operate as if it were the only computer controlling the application. The resource identifiers, sequence numbers, etc. which are normally contained in packets of information sent on the network are modified, so that the application and each server receives data as it would outside of a collaborative computing session. Since not all packets are sent to each computer, a sequence number map is maintained. When input data read from any one of the computers is sent to the application program, the identifying data from that computer is modified to identify a pseudo-server so that the application program will always see input data as coming from a single source. The output data from the application program will be replicated on each of the computers' displays regardless of which one entered the input data. Thus, users of the plurality of computers can provide input to an application program and see the output from the application program which was designed only for a single user. A session might begin by a first computer transmitting prompting data to each the other computers indicative of an invitation to join a collaborative computing session to which the users can respond affirmatively or negatively. The session is preferably controlled by displaying on each computer's display a control window which allows the users to request and use tools such as a pointer. The requests for tools are managed by a floor control system which uses a first-in-first-out (FIFO) queue. When the floor control is on, tool usage is on an exclusive basis for the user having the floor.

Commands or requests in the user data entered in the control window are executed without sending them to an application program, if one is currently executing. The tools may be used independently from or in addition to a shared application program. A scratch pad window may be created on each computer's display upon request by one of the participants. User data entered in a scratch pad window on one computer is normally replicated automatically on each of the other computers' displays, but in one embodiment the user may enter data into the scratch pad in a private mode, i.e., no one else sees the entries until the user enters a send command. Data entered by each computer in the scratch pad may be displayed with visual characteristics which are unique to the computer on which the data was first entered. The visual characteristics may include color, type style, size, or pen width.

DETAILED DESCRIPTION OF THE INVENTION

Figure 1:
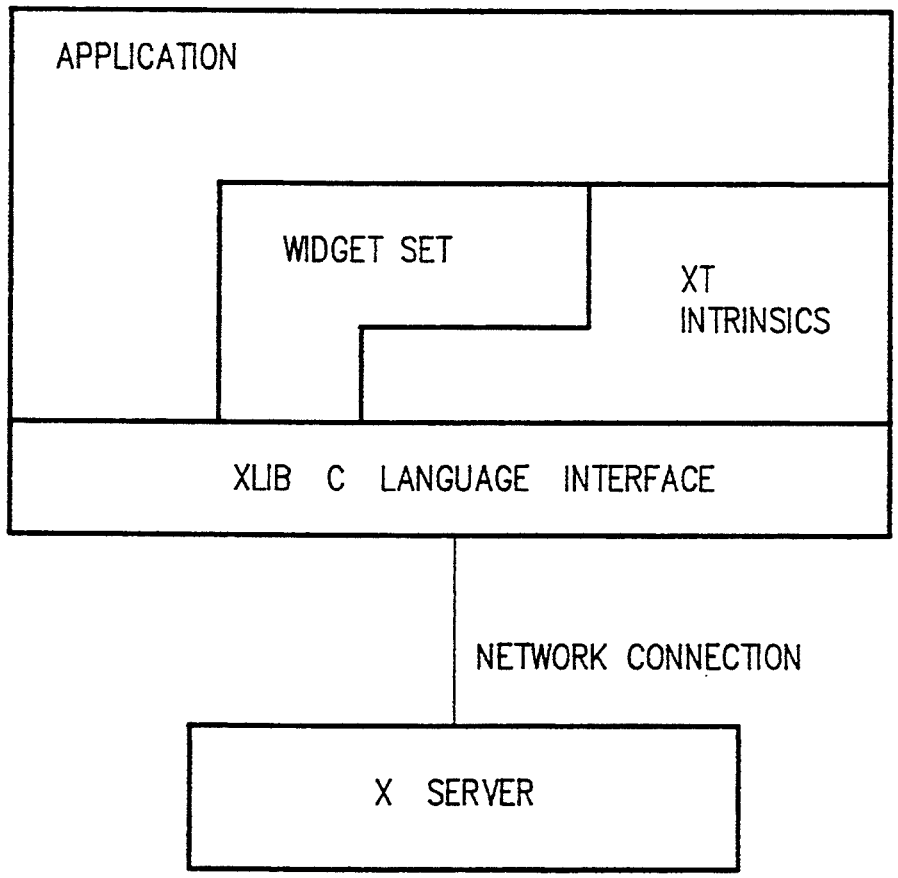
FIG. 1 is a block diagram of the major components of the the complete prior art X Window System including Widgets.

The invention is implemented in a multi-user based collaboration tool which provides a multi-user, real-time, distributed collaborative computing environment with minimal changes being required on the existing system or X application software being shared. The invention is built on standards-based prior art X Window components, i.e., XLIB and the X Toolkit, at user application level (not system, server level). X Window is a well known and well documented industry standard software interface for which source code is available from the Open Software Foundation. IBM includes X Window support in its AIX ver. 3 operating system for the RISC System 6000 which includes OSF/MOTIF. Both Hewlett-Packard and Sun Microsystems also have X Window software which is commercially available, although OSF/MOTIF may not always be included. The Massachusetts Institute of Technology also a version of Xt Intrinsics which is widely available. The method of the invention does not depend on the particular computer operating system, and therefore, is portable to any other computer platform having X Window support. In the following description references to routines with names that start with "Xt" and "Xm" refer to parts of the Xt Intrinsics and the OSF/Motif support respectively both of which are publicly available and well documented. The Widgets are used as standard ways of displaying menu bars, dialog selection boxes, etc., which are not part of the invention. The invention can be implemented using any other available widget set such Athena's widgets or Sun's Open Look widgets. Any method of displaying the required data and receiving the user input is acceptable. A complete X Window System as viewed by the programmer is shown in FIG. 1. The "Widget Set" contains routines used in implementing a multi-windowed graphical user interface. Commercially available X Window packages may not include a Widget set and will not include the network connections. The application program is normally supplied or created separately also.

The following are potential uses for the invention:

To facilitate tight collaboration between a design group and a manufacturing group using a sophisticated application such as CAT/IA or CADAM or among a group of scientist peers.

To facilitate the support of a large number of users by a small number of consultants.

To allow remote consultants to see the operation of a specialized version of some application not easily replicated because the remote consultant lacks some special hardware or software.

As a basis of a for-fee-service based on a consultant or expert being able to see and interact with the consultees' hardware and software.

To allow a team to share and control an application on an around-the-clock basis not necessarily requiring the team and application execution all be local.

Figure 2:
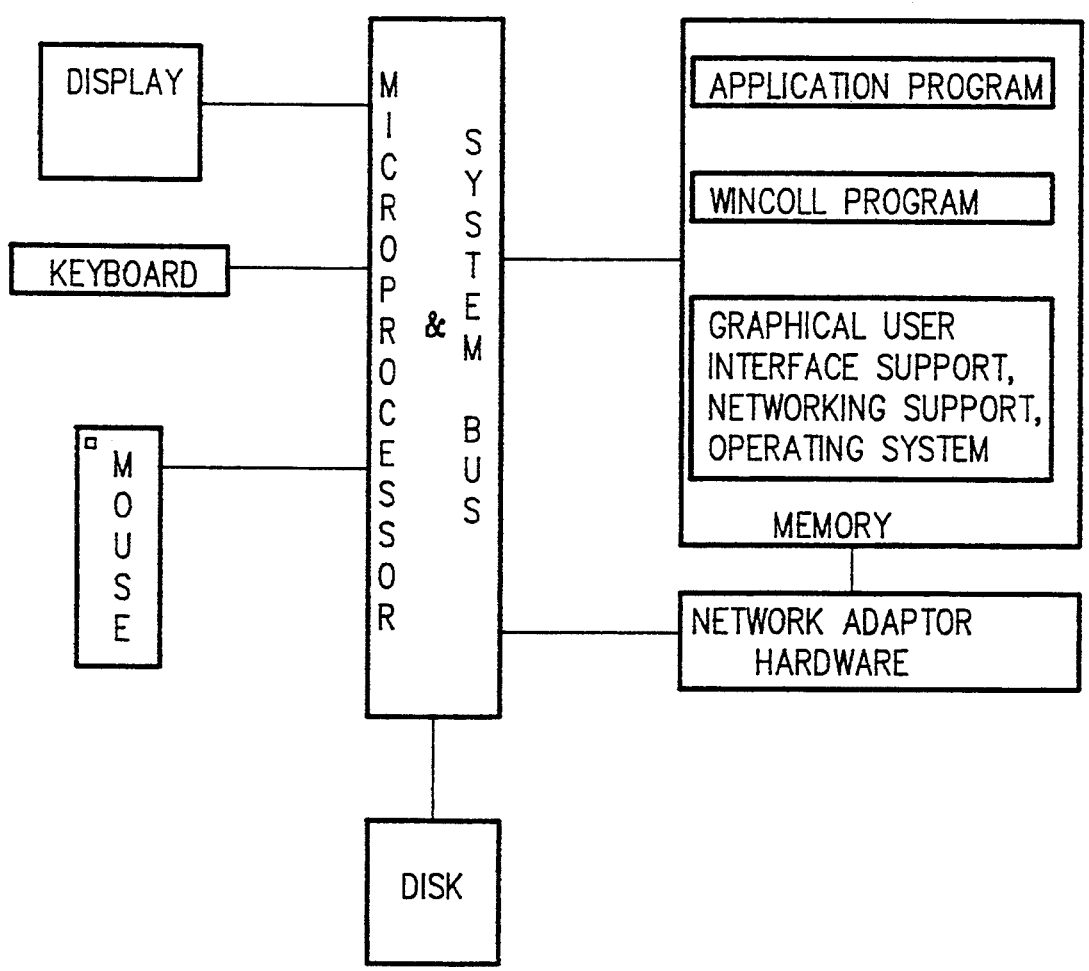
FIG. 2 is a block diagram showing typical workstation components used with the invention.

The primary embodiment of the invention will be called WinColl, but an application called XMFORUM will also be mentioned where relevant. Each of these use the X Window client-server model executing on tile AIX Version 3 for RISC System/6000. FIG. 2 shows in block form the typical components in a workstation or personal computer used with the invention. The application program and WinColl will normally be loaded into the memory of the system (RAM) from disk although execution from ROM is also feasible. The application program may be any program which uses the well known prior art X protocols. The working data, queues, semaphores, etc. are normally stored in and read from RAM, but disk storage may also be used. The prior art support software used by WinColl such as the graphical user interface (GUI) support, the networking support, and the operating system are normally executed in RAM. The microprocessor, CPU or other processor executes instructions which comprise the WinColl program and controls the input and output between the various components of the system. Special network adaptor hardware is normally required to transmit and receive data from the network. The user sees output on a display having graphical capability and inputs data or commands by use of a keyboard, mouse, or any other input device. Only one system, i.e., the one initiating the collaboration session, needs to execute WinColl. A collaboration metaphor is used to structure the communication protocol. Key building blocks include chalk, eraser, beeper, marker, pointer, invitations, windows (shared public and private), and a scratch pad. The WinColl architecture also defines access control policies and floor passing algorithms to coordinate the activities of the participants.

Figure 3:
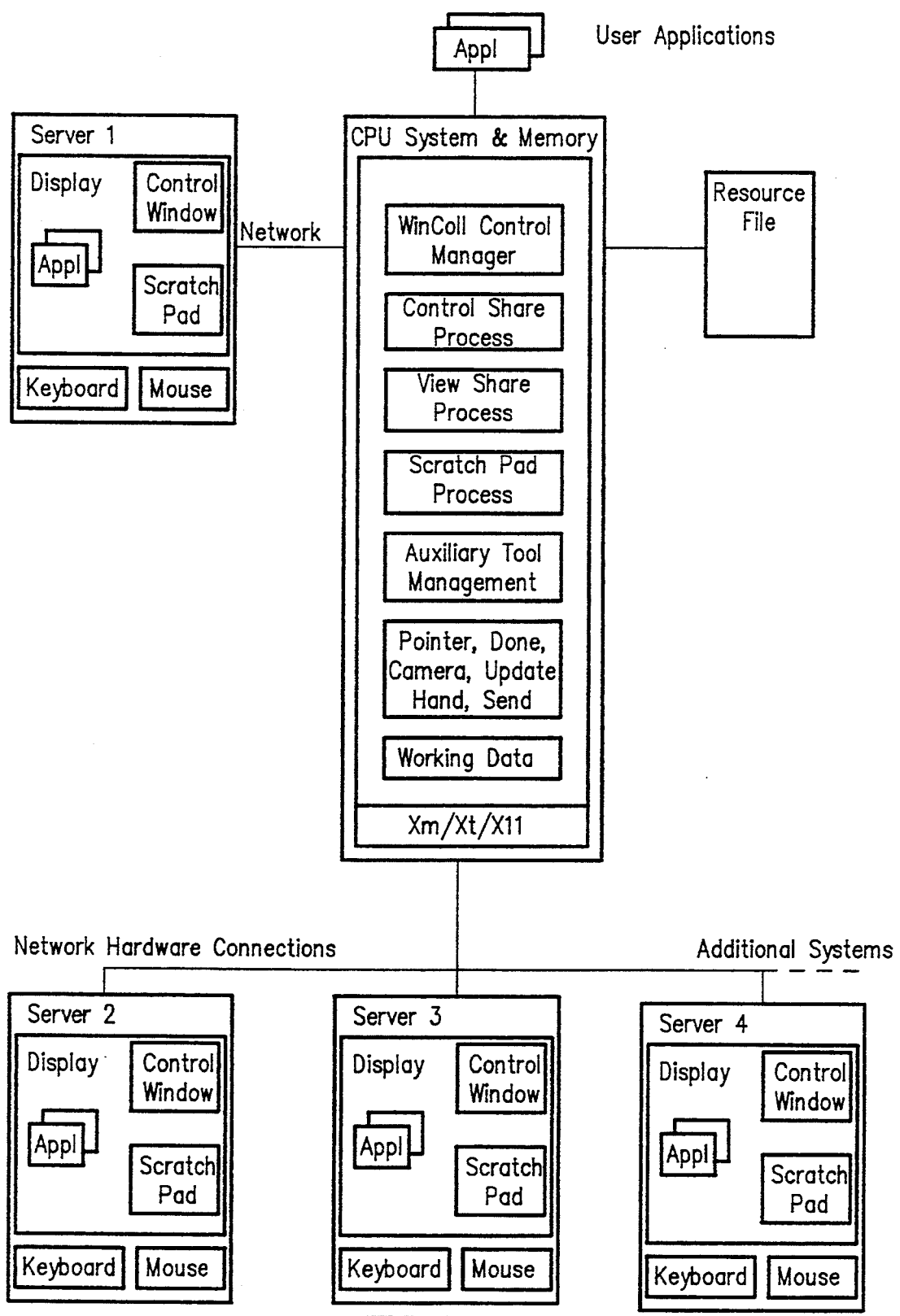
FIG. 3 is a block diagram showing a four-way collaboration using the invention.

WinColl allows sharing of an X protocol based application between two or more users in a distributed computing environment using unmodified X servers and X libraries. Reference is made to FIG. 3 which shows a four-way collaboration using the invention. The WinColl control software executes on a CPU or microprocessor which may be the same one used by Server 1, but may also be separate as is shown in the figure. Each attached Server has the typical workstation hardware including a display, keyboard, mouse, etc. (The terms workstation and computer are used interchangeably herein). The computers are interconnected by any kind of prior art network such as Token Ring or Ethernet. The application program (Appl) needs no special features to work with WinColl other than support of the prior art X protocol. The Resource File may be any data stored on disk or tape which is available to the system. The block labeled "Xm/Xt/X11" refers the prior art X Window networking support which WinColl uses to transmit and receive data to and from the plurality of servers. The functionality of WinColl is not tied to any particular operating system and is portable. In addition, WinColl provides a control window on each participant display for participants to manage the shared applications. Also, WinColl gives a set of auxiliary tools, such as a pointer, camera, or scratch pad to handle collaborative activities.

The following objectives are achieved by the invention:

X Window and a network connection are the only prerequisites.

Minimize the amount of omniscience required by not requiring anticipation of the desire to communicate.

Minimize the number of instances of WinColl which must be supported. To this end a centralized design has been used with WinColl being required only by the initiator.

Use widely supported standards and standards-based constructs without modification.

Do not require modification of existing applications.

Support both a "view" and a "control" mode. That is, a mode of sharing a view only and a mode in which application control can be passed among the participants.

Support security at least as robust as the underlying system

Minimize the learning (new skills, knowledge) required to use WinColl.

Support audio and video presentation as well as text, images and graphics.

A single copy of WinColl and a single copy of the application program run on the initiator's workstation. (See FIG. 3). WinColl sends the X window request or window images generated by the application program to the X servers of all the collaboration participants' workstations.

Figure 4A:
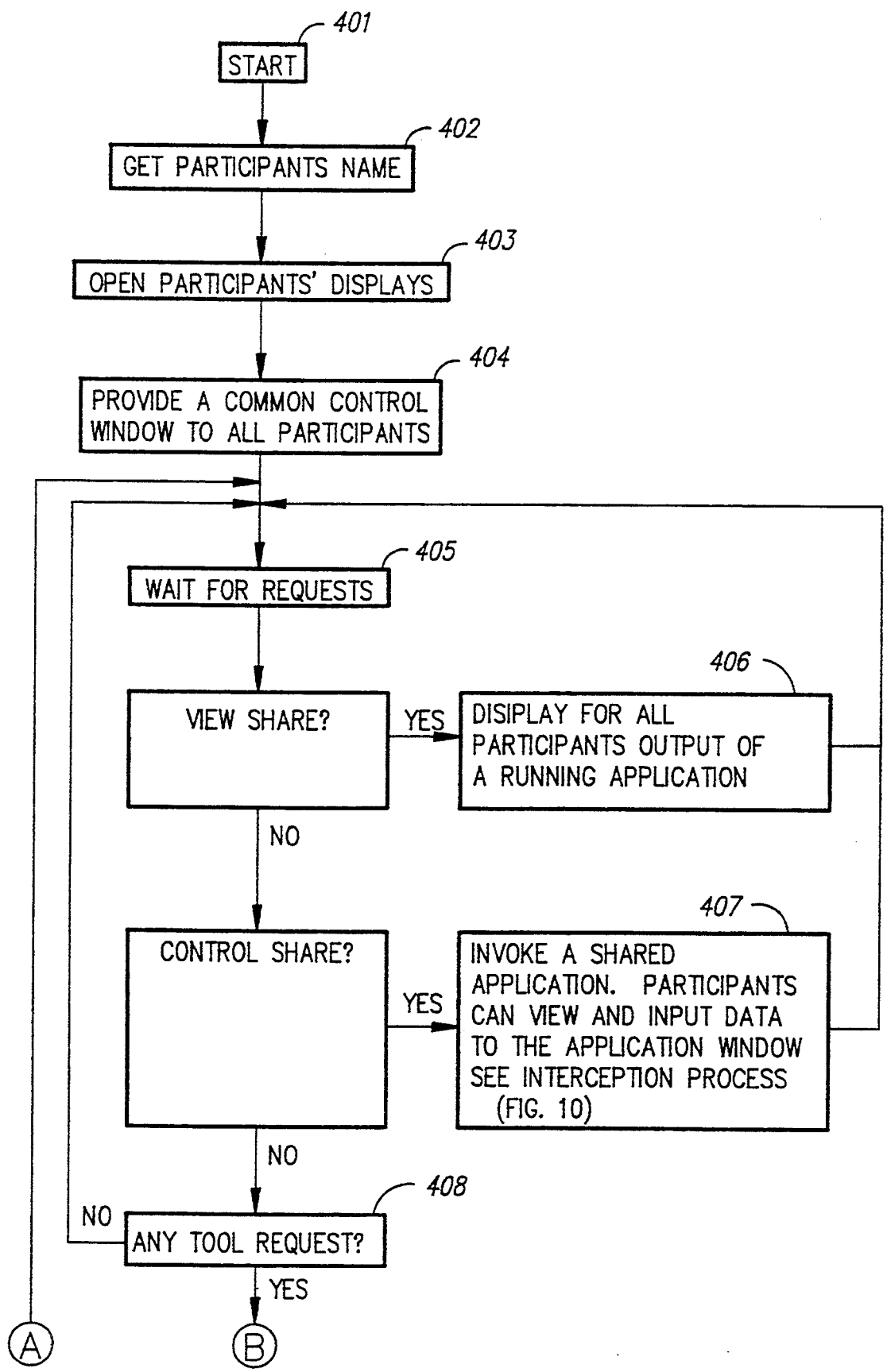
FIG. 4 is a flow diagram showing the high-level steps in the invention's method.
Figure 4B:
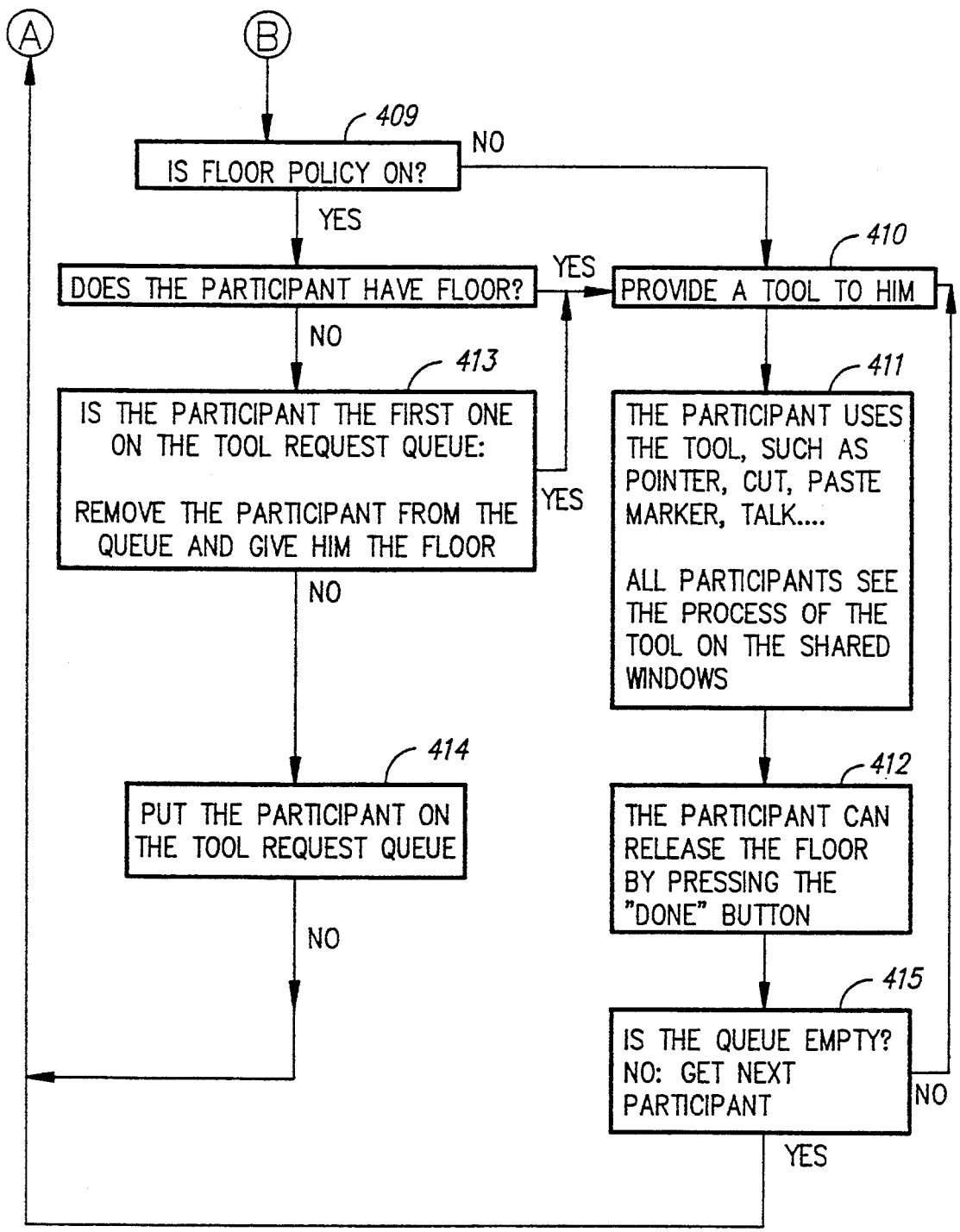

In FIG. 4 the high-level flow of an embodiment of the invention is illustrated. The process starts when a first user (initiator) enters to appropriate keystrokes or mouse clicks to invoke the collaboration software (e.g., Wincoll) or hardware/software combination 401. The initiator enters the names (or other network identifiers) of the other participants (invitees) 402. All invitees must be connected through the network by issuing standard commands 403. All invitees maybe prompted to enter a yes or no reply indicating whether they want to participate. A "no" reply results in deleting that invitee's name from the list of participants and no further data will be sent to that participant. A common control window is displayed on each of the remaining participants' displays using the connection established above 404. The method then goes into a processing loop wherein it waits for requests or commands from any participant 405. The three basic types of requests are for View Sharing 406, Control Sharing 407 (which invokes the Interception Process of FIG. 10), and a tool request 408. When a tool is requested the ON/OFF state of floor control is tested 409 if floor control is OFF then the tool is provided to him 410, i.e., he is enabled to use the tool (he is given the floor) and the results of the use of the tool are displayed on all participants' displays 411. The identity of the user having the floor is kept in a variable stored in memory. The participant releases the tool and thereby, the floor by pressing (clicking on) the graphical done button in the control window 412. When the floor is released by one user, the queue is checked to see if it is empty and if it is not empty, the next (top) request on the queue is removed 415. The floor and the tool are given to that user by looping back through the tool providing steps. If the participant requesting the tool does not already have the floor and if floor control is ON, then the request queue status is checked 413. The participant only gets the floor if he or she is the first one in the queue, otherwise the request is placed on the queue 414. After the tool request has been processed or queued, the process goes back to the top of the loop to wait for additional requests 405. Thus, in addition to the conferencing tools, there are two main schemes to share output from and/or control of an application. We call these schemes "replication" and "interception" to provide view share and control access share, respectively.

Replicating Running Applications (View Share)

Figure 5:
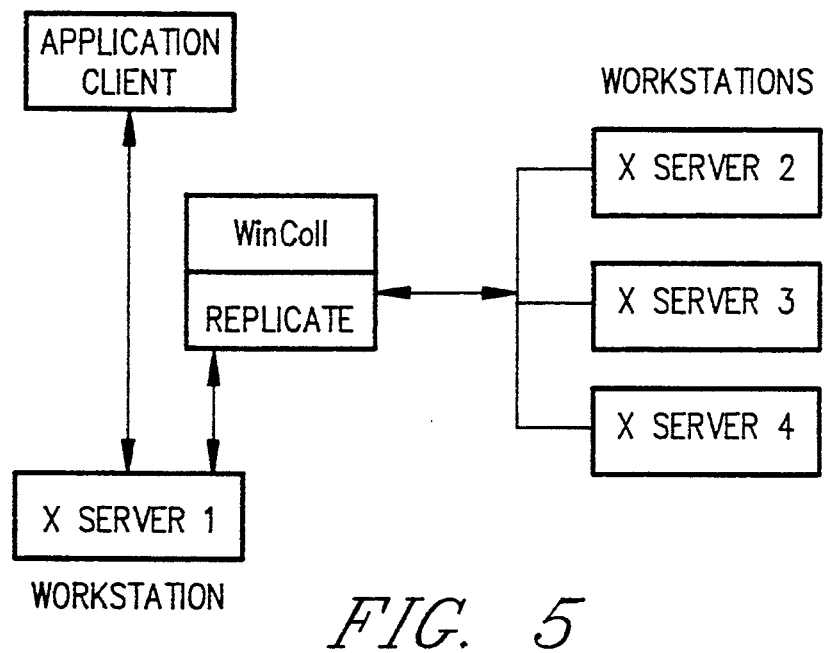
FIG. 5 illustrates the data flow in View Sharing.

WinColl supports replicating a running application window to participating workstations for viewing. (See FIG. 5). This allows other participants in a collaboration to see the processing of an application without executing it. Thus, participants can collaborate on a problem without having identical resources, Using the replicating mechanism, WinColl can bring any running X applications into a collaboration. This means that a running X application program can be added to a collaborative computing session without restarting the application. View sharing of applications is accomplished simply by "clicking" on the window to be shared after selecting the form of sharing desired (ViewShare). Only the person who started the ViewSharing of a particular application can control the application (i.e., supply keyboard input, "touch" sensitive areas on the screen, etc.). The other participants may see the contents of the shared window, point with a shared pointer to items in the window or take snapshots of regions of the window to paste in other windows for future use.

Intercepting Existing Applications (Control Share)

Figure 6:
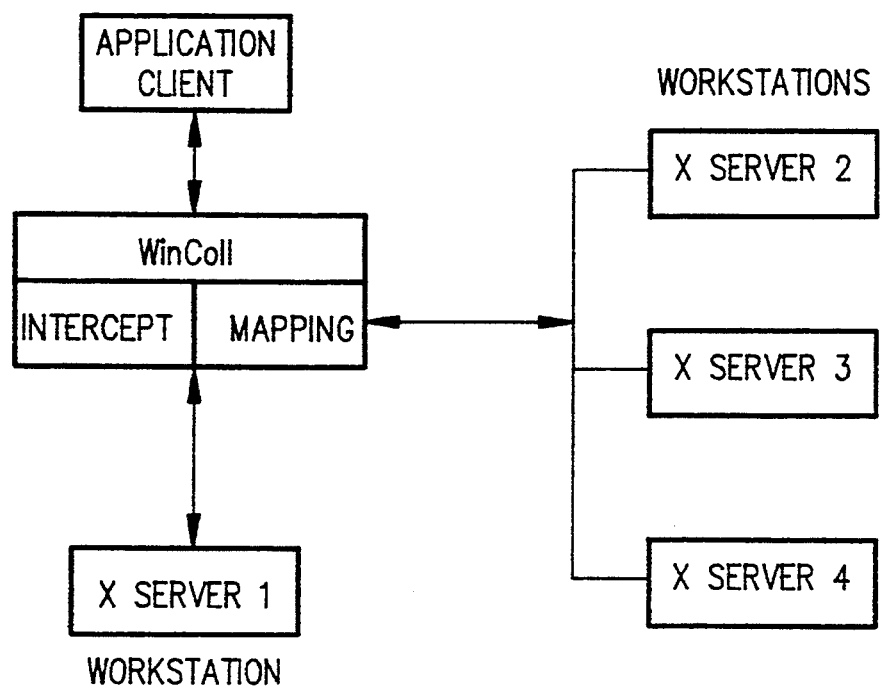
FIG. 6 illustrates the data flow in Control Sharing.

In order to share a common window among multiple servers for the same application, which is the client, WinColl intercepts client requests and passes them on to the multiple participants' workstations. (See FIG. 6). Also, WinColl receives replies and events from the participants' workstations and passes them back to the client. All participants can enter input to the application and all participants have identical appearing windows. Using the intercept and mapping mechanism, WinColl can ControlShare running applications in a collaboration. In ControlShare, the person starting ControlSharing of the application may pass control of the application to any of the participants.

WinColl intercepts and maps existing application traffic and passes it to each participant's workstations. To the user's application, WinColl looks like the X server. To each participant's workstation, WinColl looks like the client. The data exchanged between the user's application and WinColl corresponds directly to that exchanged directly between WinColl and the participating workstation. WinColl manipulates the contents of each request and then passes the request on to each of a group of servers that are "sharing" the application. The manipulations include modification of resource identifiers and other data fields that are unique to each server.

For example, resource identifiers have two parts. One part is determined by the client. The other part is determined by the server when the connection to the server is first established. This is referred to as the "server-part" of the resource identifier. Thus, the part determined by the server must be modified before the resource identifier is sent to each server as a part of a request in order for each server to. understand the identifier.

Conversely, to each server, WinColl appears as the client. All Replies, Events, and Errors generated by the many servers are passed to WinColl. WinColl filters the data and passes only one reply back to the client, because the client continues to behave as if only one server exists. Events are filtered as a function of the current floor control mechanism. Thus, no floor control implies that all events from all servers are passed to the client, whereas if only one server has the floor, only that server's events will be sent to the client.

Figure 10A:
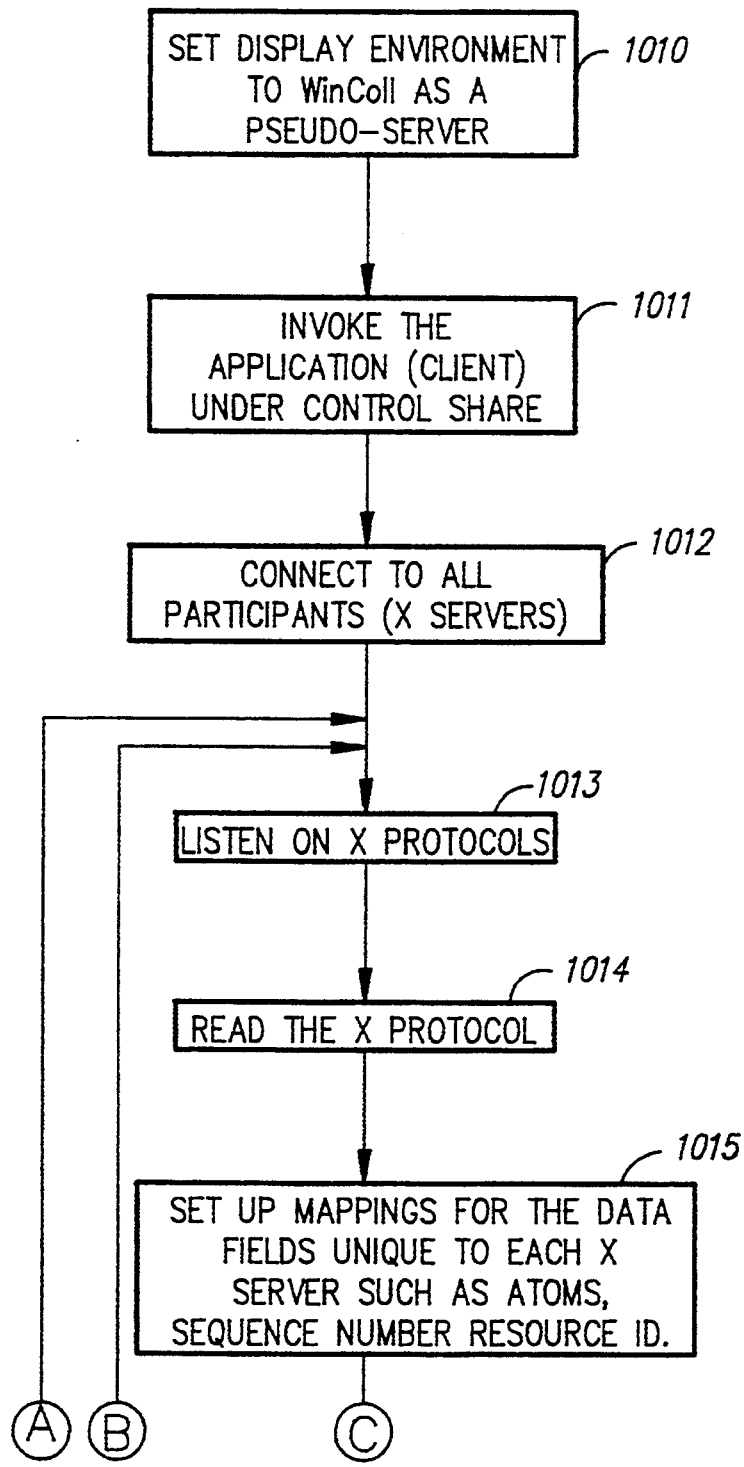
FIG. 10 is flow diagram illustrating the Interception Process used in the invention.
Figure 10B:
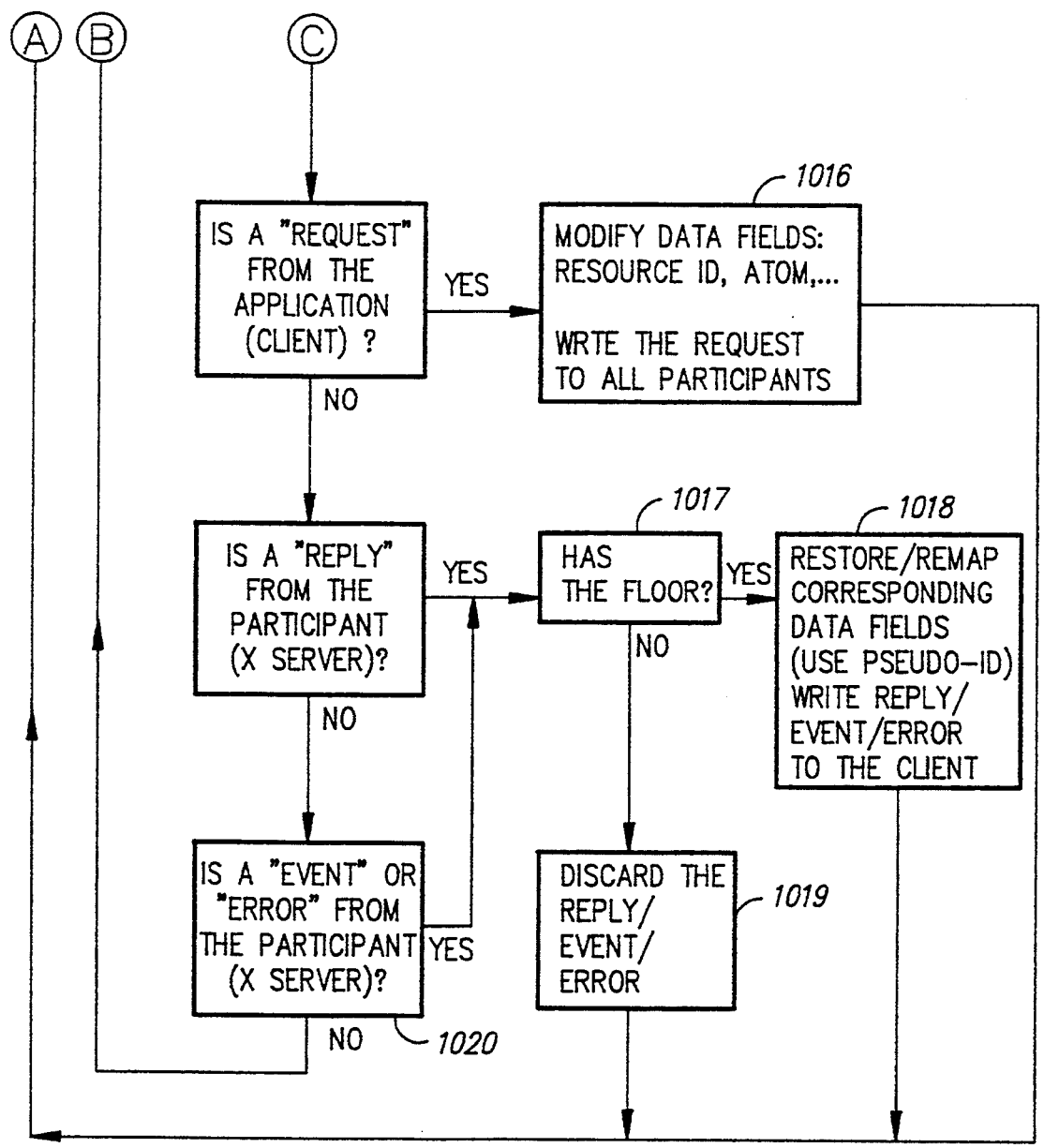

FIG. 10 illustrates the Interception process. The Display Environment on a selected one of the computers in the network where the application program will be loaded is set to identify WinColl 1010. This has the effect of making WinColl act like a psuedo-server for the application program; thus, the term collaboration server will =also be used to describe this aspect of WinColl. The application program, also called simply the application, is invoked (loaded) on the selected computer 1011. Typically this computer will be the same computer on which the collaboration software is being executed, but may be any computer in the network. Invoking an application is performed using conventional commands which are part of all modern operating systems. The operating system will typically copy the application from the disk storage into RAM and start it executing. Typically the application invoked for Control Sharing will require keyboard and/or mouse input and will wait for this input after =displaying output data which prompts the user for the needed input. The X Servers =for each participant are sent appropriate network commands to establish the connection 1012. This connection is in addition to the connection established in the initial process 403. The two connections are tracked so that data can be routed to the right window on the participants' displays and so that input data can also be identified as coming from the control window or the application window. The process then goes into a listening mode 1013 and reads the X Protocols when transmitted 1014. The listening mode is the first step in the master loop for this process. The mappings unique to each X Server such as atoms, sequence number, resource identifier (id), etc. are setup 1015. If data read is a request from the application, the unique fields are modified for each X Server and then sent to each X Server so that the request (which may include output data) is received by each X Server with the correct data in the unique fields 1016. If the data is a reply from a participant's X Server, whether the participant has the floor is tested 1017. If the participant has the floor, then the unique data fields in the request or reply are modified to represent an arbitrary preselected Server and the modified request/reply is sent to the application 1018. A pseudo-id is used as the resource id. The modified fields make the request/reply look as if it comes from the same Server regardless of which Server it actually came from. If the participant does not have the floor, then the request/reply is discarded 1019. If the data is an "event" or "error" from a participant's X Server, the same path for a reply is followed 1020. The process loops back to the listening point after fully processing each request, reply, event, error, etc. The process ends in the standard way when the participants enter the appropriate commands.

BUILDING BLOCKS

A Control Window

Using Xt Intrinsics to associate WinColl functions to many different types of standard OSF/Motif widgets, WinColl provides a graphical user interface to participants. Using a WinColl control window, participants can easily press the buttons to invoke and manage all the shared applications and tools, such as a pointer, marker and camera, during a collaborative computing session.

Unmodified Existing X Application Programs

WinColl shares any existing user X window application program as the content of a collaboration. It allows users at separate X workstations to share the contents of a user X application window whether the application is static or dynamic. Sharing existing applications is the primary function of WinColl. No modification of the application nor standards components is required. The two main modes of sharing an existing application are ViewShare and ControlShare as previously described.

A Scratch Pad

WinColl provides a scratch pad function. A participant at any location can start a scratch pad, which will be seen by all other participants, simply by clicking on WinColl Control Window. More than one instance of scratch pad can be running at a time. It provides a shared space for all the participants to draw, type and annotate "snap shots" from other windows. It can import and export files. An individual participant may select unique type styles, size, pen widths, or colors to distinguish himself.

A Shared Pointer

WinColl uses a mouse cursor or a pointer icon as a shared pointer in a collaborating session. Participants can press the pointer button to request a shared pointer to point to the items of interest in any of the shared application windows. Participants on the other workstations see the pointer movements when it is in any of the shared windows.

The shared pointer has two modes, a public mode and a private mode. When a participant requests a shared pointer, the pointer becomes a public pointer. That pointer movement will be shown on all the shared windows. The public pointer changes to a private mode when the participant moves his own pointer. The private mode overrides the public mode. For example, if participants on qe1, qe2, qe3, and qe4 share the same pointer, when the participant on qe3 moves his pointer, his pointer movement will be shown on all others, qe1, qe2, qe4's, displays.

Auxiliary Tool Management

Auxiliary tools include audio/video and a marker, pointer, and camera. WinColl associates each auxiliary tool to a button in the control window. Participants can press the buttons to obtain a tool to manage the shared applications during a collaborative computing session.

There is only one copy of each tool. The use of each tool among the participants must be managed in the collaboration session.

Figure 7:
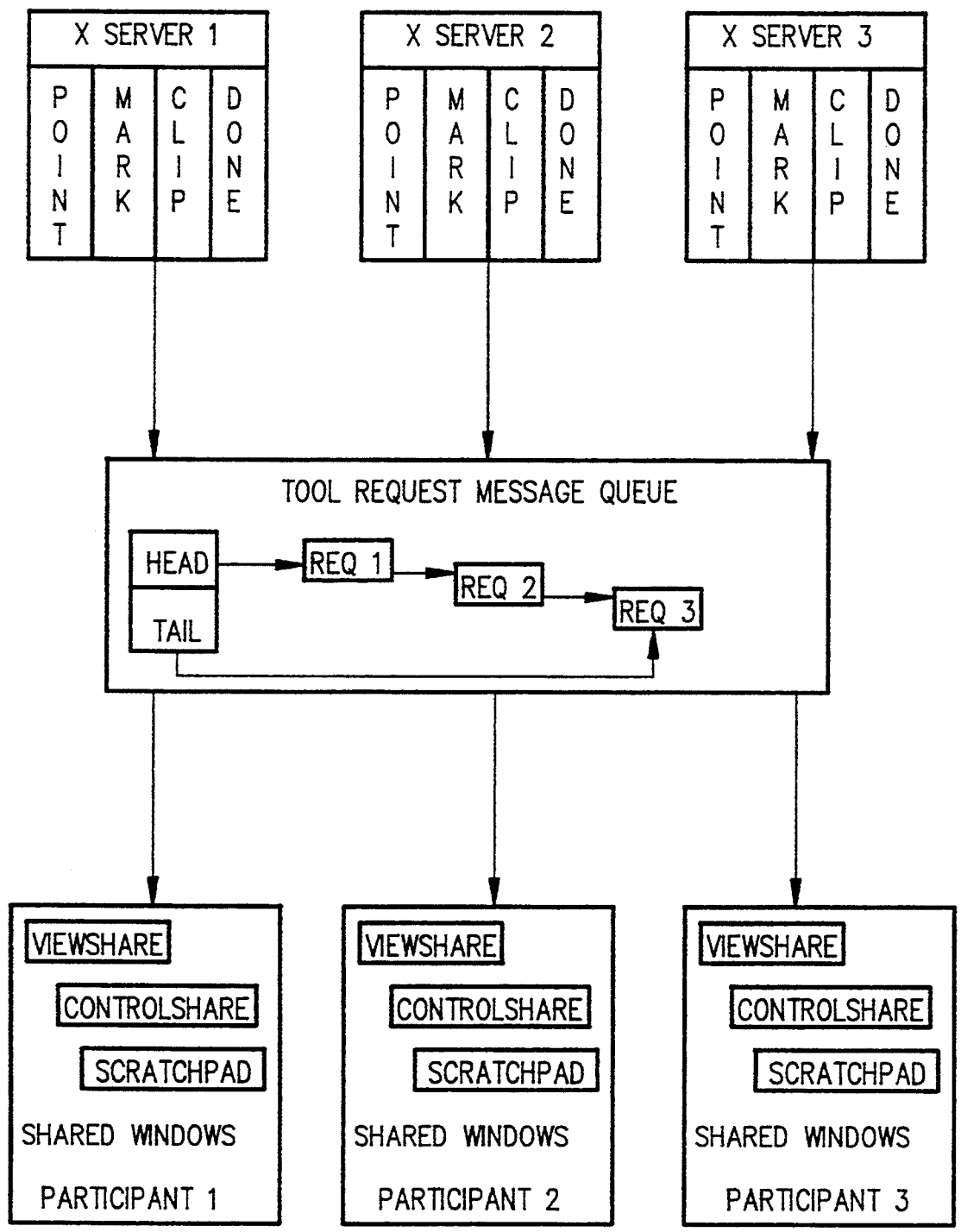
FIG. 7 illustrates the Tool Request Message Queue.

Participants on X server 1, X server 2, and X server 3 in FIG. 7 share the same FIFO tool request message queue. For example, participant 1 requests a pointer by clicking on the "point button". His pointer request will be put on the head of the queue. It there is no one else on the queue, the request will be granted. Then participant 1 is allowed to use the pointer to point to the areas of interest in any of the shared windows. Participants on the other processors see that pointer movement. Participant 1 can release the pointer to other participants by pressing the "Done" button in his control window. The point, mark, and clip buttons are also in the control window. The shared windows appear on all three participants' displays and can include a ViewShare, a ControlShare and a ScratchPad window.

Using A Central Control Window

A WinColl control window is provided on each participant's screen. It manages the processing of a collaborative computing session. It controls the degree of sharing among the participants. In addition, it broadcasts the status of shared auxiliary tools, such as the pointer, marker, and camera.

Control of Floor

Only one participant may have the floor at a time. Floor control can be on, off, or managed by a participant. There is only one instance of each type of tool (chalk, eraser, pointer, marker, camera) per collaborative computing session, and one tool tray per collaborative computing session to hold the tools. The participant who has the floor has all the facilities of the collaborative computing functions and tools. That is, is able to draw, is able to talk, etc.

WinColl controls the passing of the floor and hence tools. Whoever has the floor has control of the tools in the tool tray. When tools are not in use they are stored in the tool tray. An example of a floor passing algorithm is:

Pass the tool to a participant if the tool is in the tray, i.e., not in use.

Enqueue a floor request on a FIFO queue when the floor is busy.

Retrieve the floor from a participant when the current floor holder signals "Done".

Use a beep to tell the first participant in queue when the floor is available.

Control of Application

The participant who adds an application to the content of a collaborative computing session is treated as the owner of that application. WinColl adds the application window to all other participants' screens. The application window(s) will be removed from the participants' screens when the application ends or the owner of the application(s) terminates the application. However, participants may close, resize, and reposition the application window independently on their own screen at any time.

Control of Local Display

Participants are responsible for managing their own display. The WinColl windows can be managed locally without impacting the displays of other participants.

Control of Participants

Participants can be added or deleted in the middle of a collaboration session. Any participant has the ability to make the suggestion.

DESIGN CONSTRAINTS

Since X was not designed for sharing, there are some difficulties when it is used for sharing existing X applications. The difficulties are caused by differences in the X server, shared application's requirements, and network environment.

Each server has its own characteristics. In general, each server has different screen size, visual type, colormap, font, and display depth. The colors on the initiator's display may not same as those on the participant's displays. The color allocation request needs to be sent to each server. WinColl will try substitute colors as best it can, but some information may still not viewable because of color conflict, contrast, etc.

One issue is whether we should maintain the same window geometry on each participant's display. If one server receives a resize event, should we force a resize of windows on each server? In order to give each participant the freedom to handle his own screen, WinColl allows participants to manage their screens locally without impacting the displays of other participants.

Each server may have a different size and number of key values and also may map its keys in a different way. A mapping mechanism to map keys between servers with different keyboards is necessary.

There are many unexpected events, such as expose, reparenting notification, and keymap notification which should be filtered to avoid confusing the running application client.

The main area that can impact the collaboration over multiple servers is the network speed. Performance of the shared application is dependent on the network workload and the performance of each workstation. In order to balance the workload, WinColl should be installed on each gateway and link multiple copies of WinColl together.

The initiator starts the collaborative computing session by executing WinColl on his or her processor and, thereby, creates a shared (processing) object, an invitation list, and issues invitations to the other participants (processors) to join a collaborative computing session. The participants are then prompted at their respective processor displays as to whether they would like to join that collaborative session.

For each participant who joins the collaborative computing session, connections are made with the initiator. The procedure above establishes a co-routing relationship by the first processor among a subset of the other processors subject to nonconformance by any of their members. Then, each processor has a single common view through the window and data sharing. Participants see and access the shared window objects within the collaborative computing session.

The initiator's processor cyclically enqueues and executes operations in a FIFO order received from all participated processors.

With XMFORUM, an alternative implementation, participants on each processor can then contribute text to the shared window, or in general sense act on it, in accordance with the FIFO order. Before a participant on a processor actually acts upon the shared window contents, the participant must make a signal indicating the desire to do so. If no other participants have raised this signal before, then immediate action on the shared window is granted. Otherwise the signal is put on a FIFO queue waiting for its turn to act on this shared window contents. Note that if the signal is not at the head of the FIFO queue, the signal's corresponding processor cannot even begin to act on the shared window contents. Once a participant has write access to the shared window, all other participants are restricted to read access only until the writing participant signals completion. This is in accord with the "Raise your hand and wait for your turn" policy. The actions done upon the shared window contents are seen by all participants.

WinColl does not signal the beginning and end of actions on the shared window. Every action done by each participant can be seen by participants on any or all of the other processors. WinColl synchronizes the activities of the collaborative computing environment through floor control.

Samples of Shared Objects

Text and Graphics

WinColl uses a scratch pad to provide text and graphics as the shared window objects. Users at different processors share the same scratch pad contents. Also, WinColl allows window sharing to be limited to a subgroup of participants.

XMFORUM shares text to other processors only when the respective processor signals to speak and has permission granted to speak. Each processor has two dialog boxes: one shared public window, one private window. Each processor has the same identical public window. The public window is a "view" only window. It is not editable locally by the participant on each processor. The writing into this public window is controlled by the "floor controller". The private window is editable locally and serves as a note pad to formulate the remark before the respective processor is granted the floor and subsequently broadcasts its comments.

Application Programs

WinColl can invoke or involve an X application program in a collaboration. It allows participants to share the processing of a application without executing it. For better ease of use, a pointer is added to WinColl. With the pointer, a user can easily select the application to be replicated by clicking a mouse button with the pointer in the desired window.

Audio and Video

WinColl executes on a single site for all the collaboration functions except audio/video. It requires the participating processors to have the capability to accept audio/video protocols. The mechanism to invoke the audio/video protocols follows the same method as for text or graphic data as described herein. A multimedia application sends the audio/video request to WinColl. WinColl receives the request, replaces that request with a unique audio/video resource identifier, and sends the request to all participants' workstation. The audio/video reply or event, from each participant's workstation will also be merged into a single reply/event back to the application.

Figures 8, 9:
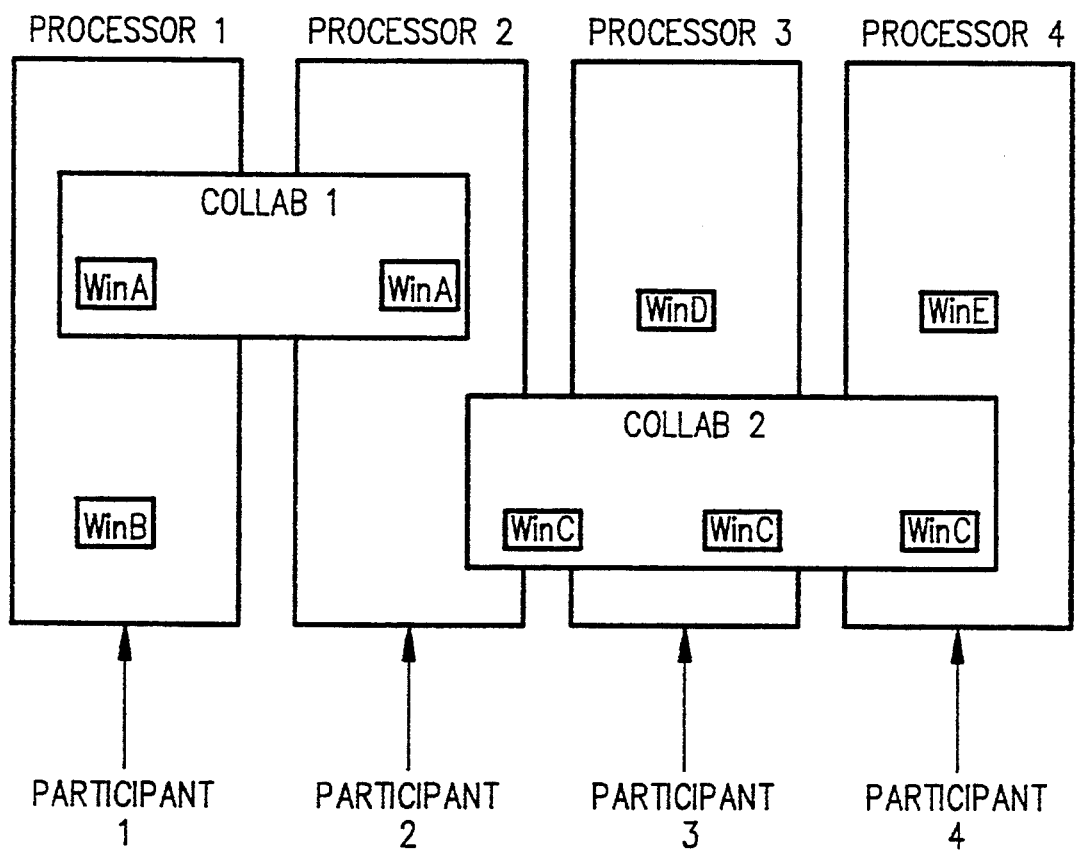
FIG. 8 is a view of two collaborative computing sessions.
FIG. 9 illustrates sequence number mapping.

In FIG. 8 two collaborative computing sessions are illustrated. Collab 1 and Collab are in progress concurrently. The participants at Collab 1 and Collab 2 share the same application A running in window A (WinA) in Collab 1. The participants at processor 2, processor 3, and processor 4 share the application C running in Window C (WinC) in Collab 2. The person at processor 2 has joined two collaborations, Collab and Collab 2 and can see both applications A and B running in window A (WinA) and window C (WinC), at the same time, but not the applications running in windows B, D, and E. The support for transferring data between collaborations is provided.

Key Implementations

Both WinColl and XMFORUM are built on a client-server model and use standard Xt Intrinsic application contexts. There are no special requirements on libraries, API, or computer systems. This invention method is portable to all computer platforms which have the X window system. The following are key implementation points:

1. Use Standard OSF/Motif and Xt Intrinsic

XMFORUM uses multiple application contexts within a single program (single process) to connect to multiple, independent X servers. The need to tie multiple application contexts to multiple X servers is inspired by the need to process events from each server independently. Basically, if each server has its own application context, then routines such as XtAppNextEvent could be used to process events from a specific server. The key here is to process each and every application context, thus each and every X server has equal priority. No application context should lag behind in service substantially nor events from any application context be lost. (The following examples use C language syntax and refer to external routines supplied as part of Xt Intrinsics).

For example:

```
/* Set up multiple application contexts */
for (i=1;i  user;i++)
{
    .
    .
    .
person(i)  appcont = XtCreateApplicationContext( );
    .
    .
    .
display = XtOpenDisplay (person(i)  appcont, s_name,
    "xmforum", "XMforum",
    NULL,  NULL, NULL);
    .
    .
    .
person(i)  topshell = XtAppCreateShell ("xmforum",
            "XMforum", applicationShellWidgetClass,
            display, args, n);
}
```

WinColl also uses Xt Intrinsic to associate collaborative computing functions to many different types of standard widgets to provide a graphical user interface to the participants. In addition, WinColl uses Xt intrinsic application contexts to allow connections to multiple processors. All the participant's processors share the same window events and actions. With one single event-driven mechanism, it greatly reduces processing time for handling multiple displays and sharing the window events. It leverages the widespread availability of X Window without requiring users to each execute the shared applications. For example:

```
XtAppContext   appl_context
disp           **displays;
XEvent         event;
    .
    .
    .
XtToolkitInitialize( );
```

-continued

```
/* get storage to handle number of participants */
displays = (disp **) XtMalloc ((sizeof(disp *))* MAX_DISPLAYS);
for (i=0; i MAX_DISPLAYS; i++)
    displays(i) - (disp *)malloc(sizeof(disp));
  .
  .
  .
           appl_context =XtCreateApplicationContext( );
```

2. Connect Multiple Widget Hierarchies on Multiple Displays

Given that multiple top level shells are created on multiple displays, each server could then have its own independent widget/window hierarchies. All widgets that are to go to a specific server are simply created as children of that server's respective top level shell. This is crucial in processing incoming events from each server and dispatching events to the appropriate widget of each server.

For example:

```
for (i=0; i num_displays; i++)
{
if (displays(i) attended = = ATTEND_YES)
{
popup(i) = XtCreatePopupShell("WinColl Control Window",
    transientShellWidgetClass, displays(i) topshell,
    args, n);
  .
  .
  .
wcwform[i]=XmCreateForm(popup(i), "WinColl Control Window", args, n);
  .
  .
  .
XtManageChild (wcwform(i));
/*  invoke existing applications   */
wc_string = XmStringCreateLtoR("ApplicationInvoke",
    XmSTRING_DEFAULT_CHARSET);
XtSetArg(args(n), XmNlabelString, (XtArgVal)wc_string); n++;
    XtSetArg(args(n), XmNalignment, XmALIGNMENT_CENTER); n++;
  .
  .
  .
displays(i) appl=XmCreatePushButton(wcwform(i),
    displays[i] dname, args, n);
XtAddCallback(displays(i) appl,XmNactivateCallback, appl_proc,
    displays);
XtManageChild (displays(i) appl);
XmStringFree(wc_string);
    /*** Display the WinColl Control Window  *****/
XtPopup(popup(i),XtGrabNone);
/*Manage the widgets, display them on the screen & wait for events */
    XtAppMainLoop(appl_context);
  .
  .
  .
```

3. Execute Multiple Processor's Operations in a FIFO Queue

XMFORUM and WinColl define a data structure for each user. Each user has his own set of widgets in the data structure. A callback is added to handle each user event. Particularly, the Hand, Send, Quit, and Clear buttons comprise the main control panel for each user. All Hand button and Send buttons are registered with =the same callback. The callback for each type of button is a generic function.

The protocol to restrict one user on the floor at a time and put everybody else on a queue is implemented through the callbacks of the Hand and Send buttons with the help of one global semaphore, endtalking. The Hand button activateCallback sets the user's request flag and puts him in the queue. The Hand button is also deactivated as soon as it is pushed (de-sensitized). The Send button on each server is initially deactivated. Only one server should have his Send button activated at a time. Thus, while looping for events on each application context, the request flag is checked. If it is set, then endtalking is checked to see if it is 'True'. If both conditions are true, then check if the user requesting is on top of the queue. All three conditions must be met before a requestor is granted the floor. When the floor is granted, the users endtalking flag is set to False, his Send button is activated and the announcer widget's label is changed to reflect that the user has the floor. The semaphore is only reset in the Send button's activateCallback procedure. Hence, once the floor is assigned to a particular user, it will not be given up until that user activates his Send button. Also note that the polling to see who has a request to speak is done in the same loop as the polling for event dispatching. This way, requests are serviced as soon as possible, but yet, with the ordering in the queue being the constraint.

For example:

```
static XtCallbackProc raise_hand (w, ptr_ptr, call_data)
Widget w;
personnel    **ptr_ptr;
caddr_t call_data;
{
int cur_index, i;
XtSetSensitive (w, False);
.
.
.
ptr_ptr(cur_index) request = True;
/* put requestor on the queue */
queue(bot_q)= cur_index; ++bot_q;
}
static XtCallbackProc send_msg (w, ptr_ptr, call_data)
Widget w;
personnel    **ptr_ptr;
caddr_t call_data;
{
int cur_index,i;
char * speech;
char * head_sent;
     XtSetSensitive (w, False);
.
.
.
head_sent= strcat (dumbheader, " says ... n");
head_pos = strlen (head_sent);
speech      = XmTextGetString (ptr_ptr[cur_index]   dtext);
text_pos = strlen (speech);
run_count = run_count+text_pos+head_pos+1;
.
.
.
end_talking = True;
/* pop off the top guy on the queue and move everybody up one */
for (i=0;i   bot_q;i++)
queue(i)=queue(i+1);
--bot_q;
}
.
.
.
/* Initialize things ... */
bot_q = 0;
for(i=0;i  user+1; i++)
queue(i)=UNKNOWN;
for(;;){
for (i=0; i  user; i++)
     {
if ((person(i)  request == True) &&
  (end_talking == True) &&
  (person(i)  connected == CONNECT) &&
  (queue(0) == 1))
{
XtSetSensitive (person[i]   send, True);
end_talking = False;
strcpy (temp, person(i)   name);
whohas = strcat (temp, " currently has the floor");
lcs = XmStringCreate (whohas, XmSTRING_DEFAULT_CHARSET);
for (n=0; n   user; n++)
{
XtSetArg (args(0), XmNlabelString, lcs);
XtSetValues (person(n)   announcer, args, 1);
};
XmStringFree (lcs);
};
while (XtAppPending (person(i)   appcont) & XtIMXEvent)
{
XtAppNextEvent (person(i)   appcont, &event);
XtDispatchEvent (&event);
};
XFlush (XtDisplay(person[i]   topshell));;
```

ARCHITECTURAL AND DESIGN DESCRIPTION

WinColl is built on a client-server model. Using Xt Intrinsics multiple application contexts, WinColl allows connections to several servers to be displayed on the screens of multiple users. All participants' servers can share the same window events and actions.

A single copy of WinColl and a single copy of the application program run on the initiator's workstation. WinColl sends the X window request or window images generated by the application program to the X servers of all the collaboration participants' workstations.

The two main schemes to share an application have been described above, i.e., "replication" and "interception".

WinColl functions as an "interceptor" that receives all requests generated by the client application. WinColl effectively appears as a server to the client by telling the client to use WinColl as the client's server. WinColl listens and accepts the client's connection on port 6000+N. N is the server's display number. WinColl then manipulates the contents of each request and then passes the request to each of a group of servers that is "sharing" the application. The manipulations include modification of data fields unique to the server such as resource identifiers, atoms, and sequence numbers, which are unique to each server.

Atom values are generated uniquely by each server. The interceptor handles the different values generated by the different servers by generating its own atom value which is then mapped to each of the different values from each of the servers. Only the interceptor's atom value is sent to the; client as part of replies or events. When the interceptor receives a request from the client containing atom values, the interceptor replaces each atom value by the corresponding values in the atom map for each of the servers.

Resource identifiers have two parts. One part is determined by the client. The other part is determined by the server when the connection to the server is first established This is referred to as the "server-part" of the resource identifier. Thus, the part determined by the server must be modified before the resource identifier is sent to each server as a part of a request in order for each server to understand the identifier. To accomplish this, the interceptor generates a single "server-part" of the resource identifier which is sent to the client. The interceptor also maintains a data structure with the "server-parts" of each of the different servers which it uses to replace the "server-part" of any resource identifiers arriving from the client before passing the requests on to each server.

Sequence numbers present a problem because not all requests are sent to all servers. This is because some requests are sent only to the floor server. Also, requests' containing a predefined resource id are sent only to the server that the predefined resource id belongs to. Consequently, sequence numbers can get out of synchronization among the servers and client. To manage this situation, the interceptor maintains a sequence number map that maps each client sequence number to a corresponding sequence number for each server. Then, when the interceptor receives any user data from a server, i.e., a reply or event, the sequence number field is replaced by a sequence number read from the sequence number map that correctly adjusts for any protocols that were not sent to a given server.

FIG. 9 illustrates the sequence number map. FIG. 9 is a 2-dimensional array indexed by server sequence numbers which range from 0 to n and by server file descriptor numbers. The server sequence numbers are shown in the column labelled "index". At point 1, the client has generated 4 requests. However, only requests 1 and 3 are sent to server 1 (svr1) while all requests are sent to server 2 (svr2).

Because request 1 is the first request seen by svr1, 1 is entered into the table in the position indexed by index =1 and svr=1. Similarly, because request 3 is the second request seen by svr1, 3 is entered in the position indexed by index =2. All requests are sent to svr2 so 1, 2, 3, and 4 are entered at index positions 1, 2, 3, and 4, respectively, for svr=2. At time b a reply is received from svr1 with sequence number =1. Because the map shows a value of 1 at index=1 and svr=1, WinColl maps the server sequence number of 1 to the client sequence number of 1. At time c a reply is received from svr1 with sequence number =2. Because the map shows a value of 3 at index =2 and svr=1, WinColl maps the server sequence number of 3 to the client sequence number of 2.

Conversely, to each server, WinColl appears as the client. All Replies, Events, and Errors generated by the many servers are passed to WinColl. WinColl filters the data and passes only one reply back to the client, because the client continues to behave as if only one server exists. Events are filtered as a function of the current floor control mechanism. If no floor control is in effect, then all events from all servers are passed to the client; whereas if only one server has the floor, only that server's input events will be sent to the client. In addition, the client expects only one reply for each request it generates. Consequently, WinColl forwards only the reply generated by the floor server to the client. All other replies are discarded.

The main data structure used by the interceptor is an array of control blocks, each representing a server or client. A client control block contains information identifying the servers with which the client is connected. The structure also maintains the current sequence number with respect to the client. Similarly, each server block contains information specific to each server. This includes the "server-part" of the resource identifier generated by the server, the current sequence number with respect to that server, the default colormap and root window of that server, and the client to which the server is connected.

The following is an example of the data fields that accompany a typical client/server request in the X protocol environment. For example, assume the client issues XQueryPointer. The data fields, display "id" and window "id" are sent to the multiple x servers. Each X server returns the address of the root, child, root_x, root_y, the pos_x, pos_y, and key_buttons back to the client. WinColl uses the coordinates of the pointer from each server to share the pointer and pointer movement among all participants.

Auxiliary Tool Management

Using Xt Intrinsic to associate the auxiliary tools to many different types of standard OSF/Motif widgets, WinColl provides a graphical user interface to participants. A WinColl control window is provided on each participant's screen. It manages the processing of a collaborative computing.

Dispatching based on Floor Control

WinColl uses a single message queue to manage the auxiliary tools. Only one participant may have the floor at a time. Floor control can be on, off, or managed by a participant. There is only one instance of each type of tool (chalk, eraser, pointer, marker, camera) per collaborative computing session, and one tool tray per collaborative computing session to hold the tools. The participant who has the floor has all the facilities of the collaborative computing functions and tools, That is, is able to draw, is able to talk, etc.

WinColl controls the passing of the floor and hence tools. Whoever has the floor has control of the tools in the tool tray. When tools are not in use they are stored in the tool tray.

The auxiliary tool sharing mechanism is built on window properties and atoms. WinColl stores the tool data and messages in the WinColl control window property at each X server. Participants can request and access the shared tool data through the WinColl control window.

Requests for tools from WinColl control window are passed to the running shared applications windows. Any one of the participants can request the floor. All the actions by the participant are shown in the window on the other participants' displays. Only one participant can have the floor at a time. All the requests for the floor must wait. There is only one chalk, one eraser, and one marker per collaboration session.

Example

```
1.In the WinColl Control Window process:
/*auxiliary tool types passed from WinColl to the shared windows */
#define POINT 1
#define CLIP 2
#define MARK 3
#define DONE 4
#define EXIT 5
/*******************************************************************/
/*create message queue for passing pointer, clip, mark, done requests*/
/*******************************************************************/
          if ((msgid=msgget(msgkey, IPC_CREAT|PERMS))==-1)
              perror("WinColl: msgget "), exit(1);
/*******************************************************************/
/*    pass participant's pointer request    */
/*******************************************************************/
static XtCallbackProc   pointer_proc(w, displays, call_data)
Widget w;
disp   **displays;
caddr_tcall_data;
{
     int    current_display=0;
     int    i, n;
     char   command_string(80);
     Arg    args(MAX_ARGS);
     XmString   wc_string;
/* write a pointer msg into the msg queue   */
          msg.mtype = POINT;                /*msg type 1 is defined for pointer*/
          strcpy(msg.mtext, displays(i)  dname);
          if(msgsnd(msgid, &msg, strlen(msg.mtext), 0) ==-1)
              perror("WinColl: msgsnd Pointer"), exit(1);
          toolHolder= i;                    /*set current tool holder */
}
/*******************************************************************/
/*   Process participant's done request to release the tool    */
/*******************************************************************/
static XtCallbackProc   done_proc(w, displays, call_data)
Widget w;
disp   **displays;
caddr_t call_data;
{
     int    current_display=0;
          -
          -
/* send a done msg through a msg queue   */
          msg.mtype = DONE;                 /*msg type 4 is defined for pointer*/
          strcpy(msg.mtext, displays(i)  dname);
          if(msgsnd(msgid, &msg, strlen(msg.mtext), 0) ==-1)
              perror("WinColl: msgsnd done"), exit(1);
          toolHolder = i;                   /* set current tool holder */
          XUndefineCursor(XtDisplay(displays(i)  pointer),
              XtWindow(displays(i)  pointer));
          break;
     }
2.In the WinColl Shared Application Window:
/*******************************************************************/
/* Tool request received by the application shared window    */
/*******************************************************************/
/*Global variable and strucute   */
struct   msqid_ds    buf;
struct   {
          long mtype;
          char mtext(80);
          } msg;
int      msgid, msgsize;
int      toolRequestor= 0;                  /*set initiator req first */
long     toolType=1;                        /*set pointer is default */
int      replicate=TRUE;                    /*trun on replication */
/*   Process all window events                      */
while (True)
          {
```

```
            XEvent     event;
            XEvent     select_event;
            /*check for pointer request from WinColl */
            if ((msgid=msgget(msgkey,0)) = = −1) {
                     perror("WinShare: msgget");
                     exit(1);
                     }
            /*Receive the first msg in the queue ,msgtype =0*/
            if ((msgsize=msgrcv(msgid, &msg, 80, 0, IPC_NOWAIT)) = = −1) {
            /* perror("WinShare: no msg, continue process window events");*/
                     goto checkWEvents;
            }
            for ( i=0; i   numDisplays; i++) {
            /* set pointer movement only when text is equal to display name*/
                     if (!strncmp(msg.mtext,displays(i)  dname,msgsize)) {
                            toolRequestor = i;
                     }
            }                                               /*end of set tool requestor from WinColl*/
            switch(msg.mtype)  {
            case POINT:
                     toolType=POINT;
                     /*pointer is on the requestor's window     */
                     for (k=0; k   numDisplays; k++)
                     {
                     XDefineCursor(displays(k)  dpy, displays(k)  win,
                            XCreateFontCursor(displays(k)  dpy, XC_hand2));
                     }     /*end of set up point cursor */
                     break;
            case DONE:
                     toolType=DONE;
                     /*done is on the requestor's window     */
                     for (k=0; k   numDisplays; k++)
                     {
                     XDefineCursor(displays(k)  dpy, displays(k)  win,
                     XCreateFontCursor(displays(k)  dpy, XC_top_left_arrow));
                     }     /*end of set up point cursor */
                     break;
            }
/*********************************************************************/
/* Continue to process X window events       */
/*********************************************************************/
checkWEvents:
            for (i=1; i   numDisplays; i++)
```

While WinColl is executing, its working data is stored in the RAM or disk of the computer or workstation of the user who initiated it. The working data includes the queues, scratch pad, sequence number maps, etc.

Using the foregoing specifications the invention may be implemented using standard programming and/or engineering techniques. The resulting program(s) may be stored on disk, diskettes, memory cards, ROM or any other memory device. For execution, the program may be copied into the RAM of the computer. One skilled in the ad of computer science will easily be able to combine the software created as described with appropriate general purpose or special purpose computer hardware to create a computer system embodying the invention. While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A method for using a plurality of computers for collaborative computing, the computers being connected in a network, and each computer having a processor, a memory, a display, means for inputting data, a network server program, and means for transmitting and receiving data to and from the computers in the network, comprising the steps of:

transmitting data from a selected computer in the network to first and second server programs in first and second computers indicative of the start of a collaborative computing session;

loading a client application program into the memory of the selected computer in the network;

displaying on the first and second computers' displays a first set of output data from the client application program by transmitting the output data to the first and second server programs;

reading user input data from the second server program along with identifying data into the memory of the selected computer;

modifying the identifying data from the second server program in the memory of the selected computer to identify the data as coming from a pseudo-server program;

sending the user input data and the modified identifying data from the preceding step to the client application program as application input data;

displaying on the first and second computers' displays a second set of output data from the client application program by transmitting the second set of output data to the first and second server programs;

reading user input data from the first server program along with identifying data into the memory of the selected computer;

modifying the identifying data from the first server program that is in the memory of the selected computer to identify the data as coming from the pseudo-server program;

sending the user input data and the modified identifying data from the preceding step to the client application program as application input data; and displaying on the first and second computers' displays a third set of output data from the client application program by transmitting the third set of output data to the first and second server programs; storing mapping data in the memory of the selected computer in the network, the mapping data indicative of the sequence of user data received from each of the first and second server programs;

receiving output data from the client application program including a sequence number field, the output data received at the selected computer in the network;

modifying the sequence number field to correspond to a sequence number one higher than the highest sequence number in the mapping data for the first server program;

transmitting the output data containing the modified sequence number to the first server program;

modifying the sequence number field to correspond to a sequence number one higher than the highest sequence number in the mapping data for the second server program; and transmitting the output data containing the modified sequence number to the second server program;

whereby, first and second computers using server programs provide input to a client application program and display the output from the client application program in a collaboration session.

2. The method of claim 1, wherein the step of displaying the output data from the application program on the first and second computers' displays further comprises the steps of:

receiving output data from the client application program including data identifying the pseudo-server program;

modifying the output data identifying the pseudo-server program to identify the second server program; and transmitting the output data modified in the preceding step to the second server program.

3. The method of claim 1, further comprising the steps of:

transmitting prompting data from the selected computer to a third server program in a third computer indicative of an invitation to join a collaborative computing session;

reading data from the third server program responding to the prompting data; and adding the third computer to the collaborative computing session responsive to an affirmative reply from the third server program.

4. The method of claim 1, wherein first and second computers have multiple windowing capability, further comprising the steps of:

displaying on the first and second computers' displays a control window;

reading user data entered in the control window on the first or second computer; and executing commands in the user data entered in the control window without sending them to the client application program;

thereby, allowing users of the first and second computers to control a collaborative computing session.

5. The method of claim 4, wherein the first and second computers also have users, and further comprising the steps of:

reading user request data entered in a control window indicative of a request by a selected user to cause data entered on the display of the selected user to be replicated on the displays of other computers in the collaborative computing session, the ability to cause the replication to the displays in the collaborative computing session referred to as controlling a floor;

testing a state of a floor control variable in the memory of the selected computer that is indicative of which user has control of the floor;

storing the user request data at the bottom of a first-in-first-out (FIFO) queue in the memory of the selected computer if a user other than the selected user has control of the floor, otherwise giving the selected user the control of the floor and setting the floor control variable in the memory of the selected computer to indicate the selected user;

reading into the memory of the selected computer data from a user having control of the floor data indicative of releasing the floor; and processing the queue in the memory of the selected computer by removing the user request data, identifying a designated user, on top of the queue, setting the floor control variable in the memory of the selected computer to indicate the designated user and giving the control of the floor to the designated user.

6. The method of claim 1, wherein first and second computers have multiple windowing capability, further comprising the steps of:

displaying on one of the first [or]and second computers' displays a scratch pad window;

modifying the contents of the scratch pad window responsive to user input data;

reading a command to transmit the scratch pad window;

replicating the scratch pad window on the displays of the other computer (first or second) by transmitting data to the other computer;

thereby, allowing a user to enter data into the scratch pad window in a private mode and transmit the contents to the other users when it is completed.

7. The method of claim 6 wherein the replicating step further comprises the step of displaying user data entered in the scratch pad window with visual characteristics which are unique to the computer on which the data was first entered.

8. The method of claim 7, wherein the visual characteristics include color, type style, size, or pen width.

9. A method for using a plurality of computers for collaborative computing, the computers being connected in a network, and each computer having a processor, a memory, a display, means for inputting data, means for transmitting and receiving data to and from the computers in the network and a network server program, comprising the steps of:

transmitting data from a first server program to a second server program in first and second computers indicative of a collaborative computing session starting;

loading a client application program into the memory of the first computer;

displaying on the first and second computers' displays a first set of output data from the client application program by transmitting the output data to the first and second server programs;

reading user input data from the second server program along with identifying data into the memory of the first computer;

modifying the identifying data from the second server program in the memory of the first computer to identify the data as coming from a pseudo-server program;

sending the user input data from the second server program and the modified identifying data from the preceding step to the client application program as application input data;

displaying on the first and second computers' displays a second set of output data from the client application program by transmitting the second set of output data to the first and second server programs;

reading user input data from the first server program along with identifying data into the memory of the first computer;

modifying the identifying data from the first server program that is in the memory of the first computer to identify the data as coming from the pseudo-server program;

sending the user input data from the first server program and the modified identifying data from the preceding step to the client application program as application input data; and displaying on the first and second computers' displays a third set of output data from the client application program by transmitting the third set of output data to the first and second server programs storing mapping data in the memory of the first computer, the mapping data indicative of the sequence of user data received from each of the first and second server programs;

receiving output data from the client application program including a sequence number field, the output data received in the memory of the first computer;

modifying the sequence number field in the memory of he first computer to correspond to a sequence number one higher than the highest sequence number in the mapping data for the first server program;

transmitting the output data containing the modified sequence number to the first server program;

modifying the sequence number field in the memory of the first computer to correspond to a sequence number one higher than the highest sequence number in the mapping data for the second server program; and transmitting the output data containing the modified sequence number to the second server program;

whereby, first and second computers using server[s]-programs provide input to a client application program and display the output from the client application program in a collaboration session.

10. The method of claim 9, wherein the step of displaying the output data from the client application program on the first and second computers' displays further comprises the steps of:

receiving output data from the client application program including data identifying the pseudo-server program;

modifying the output data identifying the pseudo-server program to identify the second server program; and transmitting the output data modified in the preceding step to the second server program.

11. The method of claim 9, further comprising the steps of:

transmitting prompting data from the first computer to a third server program in a third computer indicative of an invitation to join a collaborative computing session;

reading data from the third server program responding to the prompting data; and adding the third computer to the collaborative computing session responsive to an affirmative reply from the third server program.

12. The method of claim 9, wherein first and second computers have multiple windowing capability, further comprising the steps of displaying a control window on the first and second computers' displays;

reading user data entered in the control window on the first or second computer; and executing commands in the user data entered in the control window without sending them to the client application program;

thereby, allowing users of the first and second computers to control the collaborative computing session.

13. The method of claim 12, wherein the first and second computers have users, further comprising the steps of:

reading user request data entered in a control window indicative of a request by a selected user at a selected computer to cause data entered on the display of the selected user to be replicated on the displays of other computers in the collaborative computing session, the ability to cause the replication to the displays in the collaborative computing session referred to as controlling a floor;

testing a state of a floor control variable in the memory of the first computer that is indicative of which user has control of the floor;

storing the user request data at the bottom of a first-in-first-out (FIFO) queue in the memory of the first computer if a user other than the selected user has control of the floor, otherwise giving the selected user the control of the floor and setting the floor control variable in the memory of the first computer to indicate the selected user;

reading into the memory of the first computer data from a user having control of the floor data indicative of releasing the floor; and processing the queue in the memory of the first computer by removing the user request data, identifying a designated user, on top of the queue, setting the floor control variable in the memory of the first computer to indicate the designated user and giving the control of the floor to the designated user.

14. The method of claim 9, wherein first and second computers have multiple windowing capability, further comprising the steps of:

displaying on one of the first [or]and second computers' displays a scratch pad window;

modifying the contents of the scratch paid window responsive to user input data;

reading a command to transmit the scratch pad window;

replicating the scratch pad window on the displays of the other computer (first or second) by transmitting data to the other computer;

thereby, allowing a user to enter data into the scratch pad in a private mode and transmit the contents to the other users when it is completed.

15. The method of claim 14, wherein the replicating step further comprises the step of displaying user data entered in the scratch pad window with visual characteristics which are unique to the computer on which the data was first entered.

* * * * *

UNITED STATES PATENT AND TRADEMARK OFFICE
CERTIFICATE OF CORRECTION

PATENT NO. :   5,392,400

DATED      :   February 21, 1995

INVENTOR(S) :  Berkowitz et al.

It is certified that error appears in the above-indentified patent and that said Letters Patent is hereby corrected as shown below:

ON THE TITLE PAGE:

Item (54) and Col. 1, line 1;

Delete "COLLARBORATIVE", insert --COLLABORATIVE--.

Signed and Sealed this

Fifth Day of December, 1995

Attest:

BRUCE LEHMAN

*Attesting Officer*     *Commissioner of Patents and Trademarks*